United States Patent [19]

Krogh et al.

[11] Patent Number: 5,622,554
[45] Date of Patent: Apr. 22, 1997

[54] ASPHALT-BASED COATING COMPOSITION WITH ALKOXYLATED AMINE-DERIVED SALT SURFACTANT

[75] Inventors: James A. Krogh, Janesville; Michael R. Sipe, Milton, both of Wis.

[73] Assignee: Tomah Products, Inc., Milton, Wis.

[21] Appl. No.: 684,126

[22] Filed: Jul. 19, 1996

[51] Int. Cl.$^6$ .................................................. C09D 195/00
[52] U.S. Cl. ..................................... 106/284.06; 106/284.4
[58] Field of Search ............................. 106/284.06, 284.4

[56] References Cited

U.S. PATENT DOCUMENTS

| | | | |
|---|---|---|---|
| 3,347,690 | 10/1967 | Galvin et al. | 106/284.06 |
| 4,759,799 | 7/1988 | Vicenzi | 106/284.06 |
| 5,362,690 | 11/1994 | Vicenzi et al. | 106/284.4 |

OTHER PUBLICATIONS

Product brochure from Surface Chemists of Florida, Inc. describing SURTECH AS–109 additive for asphalt compositions no date avail.
Product brochure from Chemax, Inc. describing MAX-COTE® RC–2015 additive for roof coating compositions no date avail.
Product brochure from Akzo Chemie describing Redicote CG roof coating composition no date avail.

*Primary Examiner*—David Brunsman
*Attorney, Agent, or Firm*—Jansson & Shupe, Ltd.

[57] ABSTRACT

An improved asphalt roof-coating composition which includes asphalt cutback, clay, and a novel salt surfactant. The surfactant comprises an acid and alkoxylated fatty amines and alkoxylated ether amines. The novel surfactant amines are inexpensive and impart desirable physical properties to the composition.

23 Claims, No Drawings

ASPHALT-BASED COATING COMPOSITION WITH ALKOXYLATED AMINE-DERIVED SALT SURFACTANT

FIELD OF THE INVENTION

This invention is related generally to coatings for roofs and the like and, more particularly, to an improved asphalt-based roof coating having a novel surfactant.

BACKGROUND OF THE INVENTION

Asphalt-based roof coatings having thick, highly-viscous characteristics have been used for many years to seal joints between roof membranes, join flashings to parapet walls and otherwise repair, seal and protect roof surfaces from exposure to the environment. These roof coating products are typically available in one to five gallon pails for use by homeowners or are available in bulk for use by professional roofing contractors.

Prior art asphalt-based roof coatings typically include asphalt, clay and a surfactant. The asphalt is used as a binder and the clay thickens the composition and provides gelling properties. The surfactant is present to produce optimum wetting and dispersion by reducing the interfacial tension between the asphalt and clay. Additives known as fillers may be included to provide bulk and other properties to the roof coating composition. These asphalt-based coating compositions are an improvement over earlier compositions which include asbestos. The asbestos is added to the composition to provide texture, strength and thixotropic properties to the formulation.

A roof coating composition which is effective for its purpose must have certain characteristics, most of which are a function of the surfactant selected for use in such composition. The roof coating composition must be relatively inexpensive to manufacture (so that it can be competitively priced) because the roof coating industry is intensely competitive. As those experienced in the art are aware, small price differences per unit volume have a significant effect on product sales and can mean the difference between success or failure in the marketplace. The high cost of the surfactant, in particular, makes certain prior art roof coating compositions expensive and places such products at a disadvantage in the marketplace.

The roof coating composition must have the appropriate physical characteristics to properly seal a wide range of roof surfaces and resist degradation when exposed to extreme environmental conditions. The composition must be highly viscous to adequately coat and seal the roof surface and to stay in place at the point of application. Viscosity, of course, refers to the thickness of the composition. Increased viscosity is desirable and indicates that the clay and asphalt constituents are well-dispersed, thereby assuring optimal performance of the composition. In addition to suitable viscosity, the composition should have superior gel stability meaning that the viscosity remains constant between manufacture and application to the roof surface.

While the composition must be viscous and have good gel stability, it should also be easy to manufacture and formulate. The most desired surfactants should be liquid (not solid) so that they can be handled easily and readily mixed with the asphalt and clay without having to apply heat or extraordinary mixing equipment.

The surfactant of the roof coating composition must be robust and capable of dispersing other ingredients and imparting appropriate viscosity to compositions including a wide range of asphalts and clays. Asphalts, in particular, lack uniformity and vary greatly in constituents. Also, as is well known in the roof coating manufacturing industry, asphalts may be oxidized or unoxidized, depending upon the practice of the asphalt manufacturer. Oxidization of the asphalt can greatly affect its characteristics. Inability of the surfactant to disperse a wide range of constituents will result in loss of viscosity and cause premature failure of the composition.

But those are not the only characteristics of a preferred roof coating. Relative freedom from odor, especially offensive odor, and compatibility with composition containers and metal surfaces are others. Freedom from corrosivity may be particularly important if the composition is used for other applications such as automobile undercoatings.

One example of a very-effective prior art asphalt-based roof coating composition is disclosed in U.S. Pat. No. 4,759,799 (Vicenzi). The roof coating composition of the Vicenzi patent includes asphalt, clay and a surfactant. The surfactant is an alkyoxyalkylamine salt, preferably, decyloxypropylamine acetate which is sold by Tomah Products, Inc. of Milton, Wis. under the tradename PA-14 Acetate. Roof coating compositions using the PA-14 acetate surfactant have excellent performance and handling characteristics and are robust. Their premium price reflects the cost of the surfactant.

Another prior art roof coating composition is Redicote CG manufactured by Akzo Chemie of Chicago, Ill. Redicote CG is an asphalt-based roof coating composition and has the disadvantage of having an odor which some consider to be offensive. The odor issue is a particular problem during manufacture of the Redicote CG.

An inexpensive roof coating composition with improved viscosity and gel stability, which is easy to manufacture and apply, which is robust and capable of being used with a wide variety of asphalts and clays and which avoids the disadvantages of prior art roof coating compositions would represent a significant advance in the art.

OBJECTS OF THE INVENTION

It is an object of this invention to provide an improved roof coating composition and surfactant for use in such composition overcoming problems and shortcomings of the prior art.

Another object of this invention is to provide an improved roof coating composition which is relatively inexpensive.

A further object of this invention is to provide a roof coating composition with improved viscosity and gel stability.

Yet another object of this invention is to provide an improved roof coating composition which is easy to manufacture and apply.

An important object of the invention is to provide an improved roof coating composition which is robust and capable of being used with a wide variety of asphalts and clays.

It is also an object of this invention to provide an improved roof coating composition which is substantially free of odors which some may consider to be offensive.

Another object of this invention is to provide an improved roof coating composition which exhibits a reduced tendency toward flammability, particularly during blending.

An additional object of this invention is to provide an improved roof coating composition which, in certain embodiments, shows improved corrosion protection for metal surfaces such as metal storage containers and automobile underbodies.

How these and other objects are accomplished will be apparent from the descriptions of this invention which follow.

SUMMARY OF THE INVENTION

This invention is an improved asphalt roof-coating composition including asphalt cutback, clay and a novel surfactant composition. The composition includes about 80–95 parts by weight of a roof-coating asphalt cutback, about 5–20 parts by weight of clay, and a salt surfactant comprising an acid and an alkoxylated tertiary amine having the general structural formula:

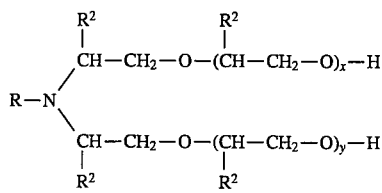

wherein R comprises $R^3$—$(OCH_2CH_2CH_2)_z$—; z is a numeric value selected from the group of numeric values consisting of 0 and 1; $R^3$ is $C_6$–$C_{20}$ when z is 0; $R^3$ is $C_{10}$–$C_{20}$ when z is 1; $R^2$ is selected from the group consisting of H, —$CH_3$, —$CH_2CH_3$ and mixtures thereof; and x+y=0–18.

The term "comprises" is used in claim 1 to emphasize that a wide range of isolated and mixed tertiary alkoxylated amines are suitable for use in the invention. The tertiary alkoxylated amines of the invention may include fatty amines (e.g., when z=0), ether amines (e.g., when z=1) and mixtures of fatty and ether amines. The preferred fatty amines have between 16 to 20 carbon atoms in the group identified as $R^3$ and may include varying degrees of unsaturation. The preferred ether amines of the invention have between 10 to 20 carbon atoms in the group identified as $R^3$ and also may include varying degrees of unsaturation. The tertiary amines of the invention include from 2 to 20 moles of alkylene oxide including mixtures thereof and the group identified as $R^2$ may include H, —$CH_3$, —$CH_2CH_3$ including mixtures thereof.

These tertiary amines are desirable because of their physical properties, modest cost and commercial availability. Alkoxylation of the fatty or ether amine is an important aspect of this invention because alkoxylation imparts liquidity to the surfactant. Liquid surfactants, such as those of the invention, are superior because they are easy to admix and handle. Such liquid surfactants avoid fire hazards associated with flammable solvents used to liquify solid surfactants.

Preferably, the tertiary fatty amine is selected from the group consisting of alkoxylated oleylamine, alkoxylated sterylamine, alkoxylated linoleylamine, alkoxylated linolenylamine, alkoxylated palmityleylamine, alkoxylated palmitylamine and mixtures thereof. Ethoxylated tallow amine is a most highly preferred alkoxylated amine for use in the surfactant of the invention.

Preferred alkoxylated ether amines include N,N'-bis-(2-hydroxyethyl)-isodecyloxypropylamine, N,N'-poly-(5)oxyethyleneisodecyloxypropylamine, N,N'-bis-(2-hydroxyethyl)isododecyloxypropylamine, N,N'-bis-(2-hydroxyethyl)isotetradecyloxypropylamine, N,N'-bis-(2-hydroxyethyl)octadecyloxypropylamine, N,N'-poly-(5)oxyethyleneoctadecyloxypropylamine, N,N'-poly-(8)oxyethyleneoctadecyloxypropylamine, N,N'-poly-(10)oxyethyleneoctadecyloxypropylamine, N,N'-poly-(15)oxyethyleneoctadecyloxypropylamine and mixtures thereof. N,N'-bis-(2-hydroxyethyl)-isododecyloxypropylamine, N,N'-bis-(2-hydroxyethyl)-isotetradecyloxypropylamine (separately and admixed) are most highly preferred for use as the alkoxylated ether amine of the invention.

The preferred amines will include from 2 to 20 molar equivalents of an alkylene oxide, preferably ethylene oxide ("EO"). The most highly preferred amines include 2–5 molar equivalents of the alkylene oxide with 2 moles being most highly preferred.

A wide range of acids are suitable for use in forming the surfactant of the invention. The acid may include organic acids, inorganic acids and mixtures thereof. Organic acids having branched, linear and cyclic structures are acceptable for use in the invention. Benzoic acid and isooctanoic acid are highly preferred examples. Other highly preferred acids include: formic acid, acetic acid, hydroxyacetic acid, propionic acid, isobutyric acid, butyric acid, hydrochloric acid, phosphoric acid, dimer acids, natural oil-derived acids and mixtures thereof. Acetic acid is most highly preferred.

The asphalt cutback is the predominant component of the composition and the amount of such asphalt cutback does not vary greatly with respect to the amount of clay and surfactant of such composition. The asphalt cutbacks best suited for this invention may be medium-cure (MC) cutbacks, rapid-cure (RC) cutbacks, or even slow-cure (SC) cutbacks. The asphalt may be oxidized or unoxidized.

In preferred embodiments of this invention, attapulgite clays are used. Such clays, which have been widely used in the non-asbestos systems of the prior art, are principally mined by Engelhard Corporation and the Floridin Company. The attapulgite clays are specially-sized and processed gelling clay products suitable for thickening asphalt-based coatings. Depending on the asphalt cutback used and other factors, the optimal ratio of clay to surfactant (known as the "C/S ratio") is preferably from about 8:1 to about 12:1 in formulations having about 8 to 12% clay. Formulations in which the ratio of clay to surfactant is at least about 10:1 are particularly preferred because they provide good performance yet reduce cost.

Additional ingredients known as "fillers" may be included to provide bulk and impart other characteristics to the composition. Preferred fillers include sand, mica, ground slate, diatomaceous earth, ground limestone, wollastonite, pearlite, cellulosic fibers, talc, and polyolefin fibers.

It has been found that the inventive compositions provide excellent results while using inexpensive and abundant amines and acids. Specifically, the inventive composition has excellent viscosity and gel stability. Viscosity, of course, refers to the thickness of the composition and gel stability means that the viscosity remains constant over time. The extended stable viscosity of the composition indicates excellent dispersion of the asphalt, clay and other constituents within the matrix.

While not wanting to be bound by theoretical considerations, it may be that the alkoxylated tertiary amines, with their pendant hydroxyl groups (particularly from the preferred EO) form hydrogen bonds with water present in the clay while the hydrophobic alkyl chain of the amine is dissolved in the asphalt thereby enhancing viscosity and gel stability of the composition.

Examples of suitable asphalt cutbacks for use in this invention are: Exxon 7057, an MC cutback available from Exxon Corporation, Houston, Tex.; Gardner cutback, an MC cutback available from Gardner Asphalt Company, Tampa, Fla.; Trumbull 6009 (oxidized) and 6032 (unoxidized), available from Trumbull Asphalt, Summit, Ill.; and the asphalt cutback from Seaboard Asphalt Products Company, Baltimore, Md. Suitable asphalt cutbacks are available from many other sources.

Examples of suitable clays include: Min-U-Gel AR, an attapulgite available from Floridin Company, Berkeley Springs, W. Va., and attapulgites known as ATTAGEL 36, 40, 50 and 2059, available from Engelhard Corporation, Edison, N.J. Such clays are available commercially in different particle sizes. Other clays may be used, but the attapulgites are highly preferred.

Suitable fatty amine and ether amine precursors for use in the surfactant are available from Tomah Products, Inc. of Milton, Wis. Alkoxylated fatty amines available from Tomah include: E-T-2, E-T-5 and E-T-15 (tallow amines with 2, 5 and 15 moles respectively of EO). Tomah alkoxylated ether amines suitable for use in the invention include: E-14-2, E-14-5, E-17-2, E-17-5, E-19-2, E-18-2, E-18-5, E-18-8, E-18-10, E-18-15 and E-22/20-2. In each of these Tomah alkoxylated ether amines the last number refers to the number of moles of EO present.

Suitable acid precursors for use in the surfactant are readily available from commercial sources. These include, without limitation, formic, hydrochloric, phosphoric, and benzoic acids from Ashland Chemical Co. of Columbus, Ohio, and acetic and propionic acid from Eastman Chemical Co of Kingsport, Tenn. Hydroxyacetic acid is available from Aldrich Chemical Co. of Milwaukee, Wis. and butyric and isobutyric acid are available from Hüls America, Inc. of Piscataway, N.J.

Many dimer acids are useful in this invention. A commercial source of useful tall oil-based acid dimers, oleic acid dimers and linoleic acid dimers is the Witco Corporation, Oleo/Surfactants Group, Greenwich, Conn.

The natural oil-derived acids are well known to the art and are obtained by saponification of the polyglyceride esters present in the respective precursor oils. Illustrative acids include corn oil acid from Arizona Chemical Co., Panama City, Fla., cottonseed acid from Witco Corporation, Humko Chemical Division, Memphis, Tenn., and linseed acid and soy acid available from the Procter and Gamble Co., Cincinnati, Ohio and tall oil acid sold by Westvaco Corporation, Charleston Heights, S.C.

Fillers suitable for use in the invention are available from many commercial sources.

The viscosity of the compositions of this invention may be described as pseudoplastic and thixotropic. Such properties are shown by: the gel strength of the compositions; their relatively high viscosity at low shear rates; their relatively low viscosity at high shear rates; their good uniformity in viscosity reduction in response to uniform shear applied over a period of time; and their good recoverability, that is, recovery of initial properties after shear has ended.

The gel strength contributes to stabilizing the final coating composition against settling over long periods in storage. The high viscosity at low shear rates maintains mix uniformity during processing, packaging and application. The low viscosity at high shear rates makes application easier. And the good recoverability of viscosity minimizes sag and flow after application while solvent evaporation is occurring.

In addition, embodiments which include organic acids, such as acetic acid, are not corrosive and may be used with metal containers and surfaces such as automobile underbodies.

PREPARATION OF THE COMPOSITIONS

Preparation of the inventive roof coating composition will vary somewhat depending on the particular constituents to be used in the composition and the type of mixing apparatus available for processing of the constituents. These processing steps are not critical and, while considerable variation is possible, certain blending procedures are preferred.

The inventive surfactant is prepared by admixing the amine with about one molar equivalent of the selected acid although the amount of acid is not absolute and may be varied and remain within the scope of the invention. Blending of the asphalt, clay and surfactant tends to vary based on the processing equipment to be used. In general, if a high-shear mixer is used, the preferred order of addition involves first mixing the asphalt cutback, surfactant, and clay until they are gelled. Then any fillers are added and mixed with the gelled composition. If low-shear equipment, such as a paddle or ribbon mixer, is employed (or if the clay concentration is low in a high-shear mixer batch), the use of a pre-gelling technique is recommended to enhance gelling and optimize dispersion. The preferred pre-gelling process consists of thoroughly mixing all of the surfactant with all of the clay and a portion of the asphalt cutback (preferably about two-thirds) until a thick gel is formed. Then the remainder of the cutback and all of the filler(s) are added and thoroughly mixed. Additional solvent can be added if required after the mix is uniform.

The choice and amount of fillers added in the mix depend in part upon whether the composition is to be a brushable roof coating, a sprayable coating, or a roof cement. The desired final viscosity and texture of the asphalt coating composition can be adjusted by the fillers which are added.

Determining the optimum amount of the inventive surfactant in a coating is critical. The optimum is considered the least amount (that is, the highest C/S ratio) providing the desired gel characteristics and excellent gel stability. The optimum ratio depends primarily on the specific amine acid precursors selected, the asphalt used, the degree of asphalt oxidation, and the amount of any type of clay used. Therefore, an optimum ratio must be determined for each combination.

One method of determining the optimum C/S ratio is to run a ladder of C/S ratios in a mix of a particular ratio of the chosen clay to the combination of the surfactant and chosen asphalt cutback—for example, 12 parts by weight clay to 88 parts by weight asphalt cutback and surfactant combined.

The C/S ratio may then be varied in 0.5/1 increments (within what is considered an acceptable range), and readings on the gel characteristics of the resulting compositions should be taken at periodic intervals after mixing (such as 24 and 36 hours and several times during a week until a final reading one week after mixing). Temperature and pressure conditions should preferably be controlled during the period of such testing.

The range of ratio increments tested need not be broad, but may start, for example, around 8:1 and extend to perhaps 10:1 or 12:1. Once the optimum C/S ratio is established for a particular asphalt cutback and clay, the same "recipe" can be used with confidence and without further testing to produce coating compositions of this invention made with such cutback and clay at the predetermined C/S ratio.

The instruments and procedures for measuring gel characteristics will not be described here. It is preferred that the recommended ASTM test procedures be used, but any appropriately sensitive test instrument (such as a good penetrometer) and reliable test procedure will be acceptable if properly used.

Large variations in the readings of the gel characteristics over the course of the test period indicate a lack of gel stability. This tends to indicate an unacceptable C/S ratio or some other unacceptable characteristic in the formula. Steady readings are what is desired, provided they show sufficient gel strength.

EXAMPLES OF THE INVENTION

In each of the examples which follow, an asphalt-based coating composition was made using either low-shear or high-shear blending techniques, adding and mixing the listed constituents in the manner described above. For each example the formulation is listed and comments regarding the formulation or the resulting composition are given.

EXAMPLE 1

| Trumbull Asphalt Cutback #6009 | 87.00 parts |
| --- | --- |
| Attagel 36 | 12.00 parts |
| Surfactant | 1.00 part |

This composition represents a spreadable, gelled mixture suitable for testing the viscosity for the clay/surfactant (C/S) ratio optimization. It includes an oxidized asphalt cutback, an attapulgite clay and a surfactant consisting of a 2 mole ethoxylated tallow amine (Tomah E-T-2) admixed with 1.0 molar equivalent of acetic acid.

EXAMPLE 2

| Trumbull Asphalt Cutback #6032 | 86.50 parts |
| --- | --- |
| Min-U-Gel AR | 12.00 parts |
| Surfactant | 1.50 parts |
| Talc | 21.00 parts |
| Interfiber 231 | 3.00 parts |

This composition represents a marketable roof coating mixture consisting of unoxidized asphalt cutback, an attapulgite clay, a surfactant and fillers added for bulk. The surfactant of Example 2 consists of a 10 mole propoxylate of an alkyloxypropylamine having a straight chain 16 and 18 carbon atom alkyl group (Tomah experimental amine P-2220-10), admixed with 1.0 molar equivalent of Hydrochloric acid.

EXAMPLE 3

| Gardner Asphalt cutback | 89.00 parts |
| --- | --- |
| Attagel 50 | 10.00 parts |
| Surfactant | 1.00 part |
| 325 Mesh Silica | 21.00 parts |

This composition represents a good roof coating composition. The surfactant consists of a 5 mole ethoxylate of tridecyloxypropylamine (Tomah E-17-5) admixed with 1.5 molar equivalents of acetic acid.

EXAMPLE 4

| Brewer Asphalt Co AC-20 cutback | 90.00 parts |
| --- | --- |
| Attagel 36 | 9.00 parts |
| Surfactant | 1.00 part |
| Sand | 21.00 parts |
| Ground Slate | 5.00 parts |

This composition produces gel characteristics consistent with roof coating compositions at lower clay levels. It consists of an asphalt cutback as used in the industry, an attapulgite clay, fillers as to supply appropriate bulk and a surfactant comprised of the 2 mole ethoxylate of decyloxypropylamine (Tomah E-14-2) admixed with 1.0 molar equivalents of benzoic acid.

EXAMPLE 5

| Trumbull Asphalt Cutback #6009 | 86.00 parts |
| --- | --- |
| Attagel 36 | 12.00 parts |
| Surfactant | 2.00 parts |
| Diatomaceous earth | 18.00 parts |
| Interfiber 231 | 3.00 parts |

This example includes oxidized asphalt cutback clay and fillers with a surfactant made by admixing a 15 mole ethoxylate of a coco amine (Tomah E-C-15) with 1.0 molar equivalents of acetic acid.

EXAMPLE 6

| Trumbull Asphalt Cutback #6032 | 89.00 parts |
| --- | --- |
| Attagel 36 | 10.00 parts |
| Surfactant | 1.00 part |
| 200 Mesh limestone (James River) | 41.00 parts |
| Interfiber 430 (Sullivan Chemical) | 4.00 parts |

Example 6 includes an unoxidized asphalt cutback and surfactant consisting of the 2 mole ethoxylate of a Tomah alkyloxypropylamine (E-1618-2), the alkyl group comprised of 12 and 14 linear carbon chain configuration admixed with 0.8 molar equivalents of acetic acid and 0.2 molar equivalents of phosphoric acid. The composition shows good gel characteristics.

The compositions of this invention are applied to various surfaces in the same manner as the compositions of the prior art are applied. They are usable as roof coatings, roof cements, vehicle undercoatings, pipe coatings, mastics and adhesives, and for many other purposes.

While the principles of this invention have been described in connection with specific embodiments, it should be understood clearly that these descriptions are made only by way of example and are not intended to limit the scope of the invention.

What is claimed:

1. In an asphalt roof-coating composition including clay and a surfactant, wherein the composition includes:

about 80–95 parts by weight of a roof-coating asphalt cutback;

about 5–20 parts by weight of clay; and a salt surfactant comprising an acid and a tertiary amine, such tertiary amine having the general structural formula:

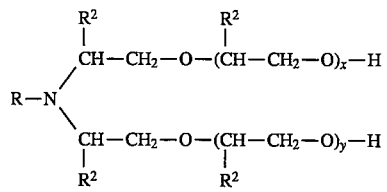

wherein

R comprises R³—(OCH₂CH₂CH₂)_z—;

the numeric value of z is selected from the group of numeric values consisting of 0 and 1;

R³ is $C_{16}$–$C_{20}$ when z is 0;

R³ is $C_{10}$–$C_{20}$ when z is 1;

R² is selected from the group consisting of H, —CH₃, —CH₂CH₃ and mixtures thereof; and x+y=0–18.

2. The composition of claim 1 wherein the tertiary amine is selected from the group consisting of alkoxylated oleylamine, alkoxylated sterylamine, alkoxylated linoleylamine, alkoxylated linolenylamine, alkoxylated palmityleylamine, alkoxylated palmitylamine and mixtures thereof.

3. The composition of claim 1 wherein the amine is tallow amine.

4. The composition of claim 1 wherein the amine is selected from the group consisting of N,N'-bis-(2-hydroxyethyl)-isodecyloxypropylamine, N,N'-poly-(5)oxyethyleneisodecyloxypropylamine, N,N'-bis-(2-hydroxyethyl)isododecyloxypropylamine, N,N'-bis-(2-hydroxyethyl)isotetradecyloxypropylamine, N,N'-bis-(2-hydroxyethyl)octadecyloxypropylamine, N,N'-poly-(5)oxyethyleneoctadecyloxypropylamine, N,N'-poly-(8)oxyethyleneoctadecyloxypropylamine, N,N'-poly-(10)oxyethyleneoctadecyloxypropylamine, N,N'-poly-(15)oxyethyleneoctadecyloxypropylamine and mixtures thereof.

5. The composition of claim 4 wherein the amine is selected from the group consisting of N,N'-bis-(2-hydroxyethyl)-isododecyloxypropylamine, N,N'-bis-(2-hydroxyethyl)-isotetradecyloxypropylamine and mixtures thereof.

6. The composition of claim 1 wherein the acid is selected from the group consisting of organic acids, inorganic acids and mixtures thereof.

7. The composition of claim 6 wherein the acid is selected from the group consisting of benzoic acid, isooctanoic acid, formic acid, acetic acid, hydroxyacetic acid, propionic acid, isobutyric acid, butyric acid, hydrochloric acid, phosphoric acid, dimer acids, natural oil-derived acids and mixtures thereof.

8. The composition of claim 7 wherein the acid is acetic acid.

9. The composition of claim 1 wherein x+y=0–5.

10. The composition of claim 9 wherein x+y=0.

11. The composition of claim 1 wherein the clay is attapulgite and forms about 8 to 12 parts of the composition.

12. The composition of claim 1 further including fillers in an amount present to provide bulk.

13. The composition of claim 12 wherein the fillers are selected from the group consisting of sand, mica, ground slate, diatomaceous earth, ground limestone, wollastonite, pearlite, cellulosic fibers, talc, and polyolefin fibers.

14. In an asphalt roof-coating composition including clay and a surfactant, the improvement comprising:

about 80–95 parts by weight of a roof-coating asphalt cutback;

about 5–20 parts by weight of clay; and a salt surfactant comprising an acid and ethoxylated tallow amine.

15. The composition of claim 14 wherein the acid is acetic acid.

16. The composition of claim 14 wherein the clay is attapulgite and forms about 8 to 12 parts of the composition.

17. The composition of claim 16 further including fillers selected from the group consisting of sand, mica, ground slate, diatomaceous earth, ground limestone, wollastonite, pearlite, cellulosic fibers, talc, and polyolefin fibers in an amount present to provide bulk.

18. In an asphalt roof-coating composition including clay and a surfactant, wherein the composition includes:

about 80–95 parts by weight of a roof-coating asphalt cutback;

about 5–20 parts by weight of clay; and a salt surfactant comprising an acid and a tertiary amine having the general structural formula:

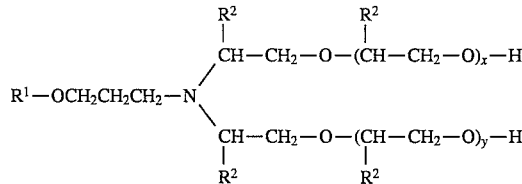

wherein

R¹ is $C_{10}$–$C_{20}$;

R² is selected from the group consisting of H, —CH₂, —CH₂CH₃ and mixtures thereof; and x+y=0–18.

19. The composition of claim 18 wherein the acid is acetic acid.

20. The composition of claim 18 wherein x+y=0–5.

21. The composition of claim 20 wherein x+y=0.

22. The composition of claim 18 wherein the clay is attapulgite and forms about 8 to 12 parts of the composition.

23. The composition of claim 22 further including fillers selected from the group consisting of sand, mica, ground slate, diatomaceous earth, ground limestone, wollastonite, pearlite, cellulosic fibers, talc, and polyolefin fibers in an amount present to provide bulk.

* * * * *